(12) United States Patent
Bugnet et al.

(10) Patent No.: US 7,858,235 B2
(45) Date of Patent: Dec. 28, 2010

(54) CERAMIC CONDUCTOR PRE-TREATED BY OXIDISING FOR A ZINC ANODE

(75) Inventors: Bernard Bugnet, Le Plessis Trevise (FR); Denis Doniat, Paris (FR); Robert Rouget, Paris (FR)

(73) Assignee: S.C.P.S. Societe de Conseil et de Prospective Scientifique S.A., Ronsy-Sous-Bois (FR)

( * ) Notice: Subject to any disclaimer, the term of this patent is extended or adjusted under 35 U.S.C. 154(b) by 26 days.

(21) Appl. No.: 12/622,564

(22) Filed: Nov. 20, 2009

(65) Prior Publication Data

US 2010/0072436 A1 Mar. 25, 2010

Related U.S. Application Data

(63) Continuation of application No. 11/041,825, filed on Jan. 24, 2005, now abandoned, which is a continuation of application No. PCT/EP03/50334, filed on Jul. 25, 2003.

(30) Foreign Application Priority Data

Jul. 30, 2002 (FR) .................................. 02 09644

(51) Int. Cl.
*H01M 4/42* (2006.01)
*H01M 6/04* (2006.01)
*H01M 4/62* (2006.01)
*H01B 1/02* (2006.01)

(52) U.S. Cl. ........................ 429/229; 429/245; 429/232; 252/520.22

(58) Field of Classification Search .................. 429/229, 429/243, 245, 232; 252/520.22
See application file for complete search history.

(56) References Cited

U.S. PATENT DOCUMENTS

| 4,041,221 | A | 8/1977 | Berchielli |
| 4,304,828 | A | 12/1981 | Vaidyanathan |
| 5,442,478 | A | 8/1995 | Lampert |
| 6,106,799 | A | 8/2000 | Lehto |
| 6,649,305 | B1 | 11/2003 | Bugnet |
| 2003/0054247 | A1 | 3/2003 | Ogasawara |

FOREIGN PATENT DOCUMENTS

| EP | 1024545 | 8/2000 |
| FR | 278887 | 7/2000 |
| JP | 58163162 | 9/1983 |
| JP | 60208053 | 10/1985 |
| JP | 01037408 | 2/1989 |

OTHER PUBLICATIONS

XP000278364—1 sheet, referring to Journal of the Electrochemical Society—F R McLarnon.
XP002051893—1 sheet, referring to Journal of Solid State Chemistry,—Shin, C H.
Chen et al., Oxidation Behavior of Titanium Nitride Films, Jun. 27, 2005, Journal of Vacuum Science and Technology A. vol. 23 Issue 4, pp. 1006-1009.
Demaison et al, Oxidation Mechanism of Titanium Nitride in Oxygen, 1979, Oxidation of Metals, vol. 13 No. 5, pp. 505-517.
Komratov—The Oxidation Kinetics of Titanium Carbide, Nitride and Carbonitride Powders in Air—vol. 36, Nos. 9-10, p. 510, 1997.

*Primary Examiner*—Gregg Cantelmo
*Assistant Examiner*—Eugenia Wang
(74) *Attorney, Agent, or Firm*—Sturm & Fix LLP

(57) ABSTRACT

The invention relates to an additive to the active mass of a zinc anode for an alkaline secondary electrochemical generator. Said additive contains conductive ceramic powder, preferably titanium nitride particles which is exposed to an oxidation pre-treatment prior to the incorporation thereof into the active mass of the anode. Said ceramic powder is used as electronic conduction in the anode active mass and as zincates retention which are produced by generator discharge. In order to use said retentive capacity, the powder is exposed to an oxidation pre-treatment, whereby making it possible to form the binding sites on the surface of ceramic grains. The inventive additive makes it possible, starting from the first cycles of the electrode formation, to form uniform zinc deposits, thereby increasing the service life for the cycling of the zinc anode.

9 Claims, No Drawings

CERAMIC CONDUCTOR PRE-TREATED BY OXIDISING FOR A ZINC ANODE

BACKGROUND OF INVENTION

1. Field of Invention

The present invention relates to the field of electrochemical generators, and more particularly to that of metal-air storage batteries and systems.

Specifically, it relates to secondary generators with a zinc anode and is intended to obtain a high level of cyclability of the zinc electrode.

The zinc electrode is well-known to the person skilled in the art for its high level of performance. It may furthermore be used in various secondary electrochemical systems: alkaline air-zinc, nickel-zinc and silver-zinc generators, bromine-zinc and chlorine-zinc generators with saline electrolytes.

2. Description of Related Art

Zinc is an attractive anodic active material, having a strongly negative redox potential of −1.25 V/NHE for the pair $Zn/Zn(OH)_2$. The zinc electrode offers a theoretical gravimetric specific capacity of 820 Ah/kg. It accordingly makes it possible, for example, to achieve theoretical gravimetric specific energies of 334 Wh/kg for the nickel-zinc pair (NiZn), and of 1,320 Wh/kg for zinc-oxygen pair. For an NiZn storage battery, the practical gravimetric specific energy may be between approximately 50 and 100 Wh/kg, the voltage furthermore being 1.65 volts, instead of the 1.2 volts for other alkaline systems.

Further advantages of zinc which should be emphasised are, on the one hand, its non-toxicity to the environment (production, use, disposal), and, on the other hand, its low cost, which is very much less than that of other anodic materials for alkaline storage batteries (cadmium and metal hydrides), or lithium storage batteries.

However, the industrial development of rechargeable systems using a zinc electrode has encountered a major stumbling block, namely the electrode's inadequate cycle life.

The reactions which occur at the anode are as follows in an alkaline storage battery:

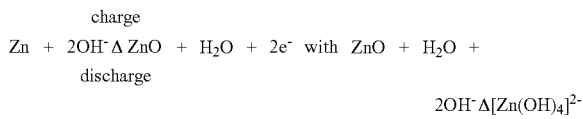

Recharging of the zinc electrode from the oxides and hydroxides thereof and from the zincates in fact generally gives rise to the formation of deposits with a structure which is modified relative to the original form, said deposits often being described as dendritic, spongy or powdery. This phenomenon moreover occurs over a very wide range of current densities.

Successive recharges thus rapidly result in the chaotic growth or outgrowth of zinc through the separators and in short-circuiting with the electrodes of the opposite polarity.

As for the powdery or spongy deposits, these prevent the reconstitution of electrodes capable of satisfactory or extended operation due to inadequate adhesion of the active material.

Furthermore, reduction of the zinc oxides, hydroxides and zincates to zinc at the anode during recharging is also characterised by morphological changes in the electrode itself. Depending on the mode of operation of the storage batteries, various kinds of changes in form of the anode are observed as a result of non-uniform redistribution of the zinc during the formation thereof. This may in particular result in a troublesome densification of the anodic active mass at the surface of the electrode, most often in the central zone thereof. At the same time, electrode porosity is reduced, which contributes to an acceleration in the preferential formation of zinc on its surface.

These major shortcomings, which reduce the achievable number of cycles to a few dozen (a level which is inadequate to ensure economic viability for a secondary system), have given rise to a large number of studies devoted to improving zinc deposition characteristics during recharging with the aim of increasing the number of charge-discharge cycles which the generator can accept.

Various very different approaches have been investigated with the objective of attempting to minimise or to delay as long as possible these zinc formation defects, the following of which may in particular be mentioned:

- "mechanical" methods intended to reduce the chaotic formation or outgrowth of zinc, or to avoid powdery deposits: circulation of the electrolyte and/or of the zinc electrode in dispersed form; vibration imparted to the electrodes; use of separators which are resistant to perforation by dendrites, frequently in multiple layers, and even of ion-exchange membranes, in order to prevent the migration of zincates;
- "electric" methods intended to improve the conditions under which the zinc deposit is formed: control of charging parameters (intensity, voltage etc.); use of pulsed current, including current inversion, in an attempt to dissolve the dendrites while they are forming;
- "chemical" and "electrochemical" methods: use of additives incorporated into the electrolyte (fluoride, carbonate, etc.) and/or into the anodic active material (calcium, barium etc.) and dilution of the electrolyte, in particular in order to limit the solubility of the zincates and to form zinc oxide and insoluble compounds of zinc.

These various methods may be implemented in isolation or in combination.

In any event, they have only limited positive effects which have proved inadequate to impart economic viability to secondary generators with a zinc anode and in particular to the nevertheless theoretically very attractive pair, NiZn; they barely make it possible to achieve or exceed around a hundred cycles performed with a significant depth of discharge.

Moreover, some of these methods have disadvantageous negative effects, such as:

- increase in the internal resistance of the storage battery (due to certain additives or to electrolyte dilution),
- reduction in the life of the nickel cathode (due to the use of certain additives),
- mechanical complexity of operation (for circulating systems),
- increases in the volume and mass of the system (impairment of specific performance parameters in terms of gravimetric and volumetric specific energies),
- increased costs (losing the potential economic advantage).

A major innovation was provided and described by the description of French patent application 99 00859, the developed technology making it possible to achieve several hundred cycles over a wide range of operating conditions and down to very deep depths of discharge thanks to the implementation of means intended to increase the efficiency of use of the active material by improving the percolation of charges within it.

The present invention is based on the observation that insufficient drainage of charges within the active material promotes the formation of the zinc deposit during recharging at sites which represent only a limited percentage of the entire active mass. This zinc growth, a phenomenon which most frequently gives rise to a chaotic deposit which may result in outgrowths through the separators or in densification of the deposit, accordingly proceeds from sites with a limited total surface area relative to the overall projected surface area of the anodic material. The technology described in the above-mentioned document shows that this mechanism may be greatly reduced if, by increasing the number of deposit formation sites, the same total quantity of zinc is deposited over a much larger surface area throughout the volume of the electrode.

According to a preferred embodiment, this technology results in the use, within the zinc anode, of two or three levels of electrical collection:

- a main collector network: an electrode support of the "metal foam" type (reticulate honeycomb structure),
- a secondary conductor network: a dispersion of conductive, chemically inert, ceramic particles in the storage battery,
- a possible complementary tertiary conductor network: a dispersion of bismuth in the anodic active mass.

An "antipolar mass", which may consist of nickel hydroxide when producing nickel-zinc storage batteries, may also be introduced into the zinc anode and makes a significant contribution to the level of performance achieved.

The aim of the present invention is to improve the cyclability of the zinc electrode by prior treatment of the conductive ceramic, before the addition thereof to the active mass of the zinc electrode, the purpose of the treatment being to impart to said ceramic powder a second function of retaining the zincates formed on discharge of the zinc anode.

In the "Journal of the Electrochemical Society", vol. 145, no. 4, page 1211, 1988, C. F. Windisch and al. describe the changes in polished discs of titanium nitride (TiN) which are immersed for 136 days in a concentrated solution of potassium hydroxide.

Compounds identified as slightly crystallised potassium titanates form on the surface of the material.

As emphasised by J. Lehto in U.S. Pat. No. 6,106,799, it is not always straightforward to distinguish between titanates and hydrated titanium oxides, since hydrated titanium oxides may be considered to be amorphous or semi-crystalline forms of titanates.

This same author points out that titanates and hydrated titanium oxides have ion-exchange properties, which are utilised for treatment of effluents containing radioactive ions.

Furthermore, titanium nitrides, in particular in powder form, are not inert with regard to atmospheric oxygen, even at ambient temperature.

Uncrystallised or slightly crystallised titanium oxynitrides and titanium oxides, which may be detected by XPS analysis, form on the surface of the grains.

RX analysis of TiN powders does not necessarily reveal the presence of titanium oxide, but a modification of the nitride lattice parameter corresponding to compounds which are sub-stoichiometric in nitrogen may be observed.

Commercial TiN powders are generally produced by nitriding titanium. They always exhibit nitrogen deficits of 0.5 to 2% relative to the stoichiometric quantity, which is 22.62% by weight. This deficit may be even larger when the powders are prepared by methods such as nitriding of titanium dioxide with ammonia, or synthesis by a self-propagating thermal reaction from titanium oxide, titanium halides, etc.

Titanium oxynitrides are of the general chemical formula $TiN_xO_y$, with x and y varying between 0.01 and 0.99.

At low oxygen contents, the (face-centred cubic) crystalline structure and the corresponding parameters of titanium oxynitrides are virtually identical to those of the nitride, which makes them difficult to identify by RX analysis. Titanium oxynitrides are black in colour, and if TiN is golden in colour, progressive oxidation of the TiN results in a colour change starting from bronze to brown and then to black.

This characteristic has been exploited for the preparation of black pigments as replacements for carbon, iron oxide or manganese dioxide powders.

Various methods have been described in the literature for preparing titanium oxynitrides:
- partial reduction of the titanium dioxide by ammonia,
- partial oxidation of very finely divided TiN,
- manufacture of TiN by plasma discharge from titanium tetrachloride.

The oxidation temperature of TiN powders, the process being accompanied by an increase in weight, is closely related to the nature of the samples. Fine powders of a diameter of approximately 5 μm begin to oxidise at around 350° C., whereas coarser powders of 50 μm will begin to do so at around 500° C. (P. Lefort and al., Journal of Less Common Metals, no. 60, page 11, 1978).

Extended, high-temperature treatment of TiN powder results in the formation of rutile-type titanium oxide. On the basis of this knowledge, the authors of the present invention thus discovered that oxidation pretreatment of TiN powders, the use of which in a zinc electrode is described in French patent 99 00859, improved the cyclability of the electrode, due to increased reactivity of the ceramic powder with regard to the electrolyte, so giving rise to the formation of hydrated titanium oxides which may themselves change into partially crystalline titanates.

It is thus possible to impart to the ceramic powder, dispersed in the anodic mass, two functions which are essential to the proper functioning of the zinc electrode:
- an electron-conductive function, which will contribute to obtaining a more uniform distribution of the formation of metallic zinc within the active mass during successive charging operations,
- a retention function for the zincates arising from the oxidation of the zinc on discharge of the storage battery, thanks to the formation of adsorbent compounds created by the pretreatment performed on the TiN powder.

As a result of this pretreatment, which is performed on TiN powders which are themselves obtained by various processes, it will be possible greatly to accelerate the formation of zincate binding sites brought about by surface modification of the TiN in accordance with a mechanism described by Windish and al. In this way, it will be possible, right from the first formation cycles of the zinc electrode, to produce uniform deposits of zinc thanks to said second function imparted to the ceramic powders. Producing the most uniform possible deposits of zinc within the anode right from the first recharge cycles is essential to obtaining a significant cycle life of generators with a zinc anode.

BRIEF SUMMARY OF INVENTION

According to the present invention, the oxidising pretreatment must be performed while avoiding the formation of a significant layer of titanium oxide, which would bring about an excessive reduction in the electron conduction of the grains, and would furthermore be totally inert with regard to the alkaline medium. This pretreatment depends on the nature and the particle size of the TiN used. The smaller is the size of the particles, the higher is the reactivity of the TiN with regard to oxygen. For use as an additive for zinc anodes, preferred TiN powders advantageously have a particle size essentially less than 10 microns.

DETAILED DESCRIPTION OF THE INVENTION

Pretreatment may more readily be performed in air. It is, however, also possible to use pure oxygen or mixtures of inert gas and oxygen. The inert gas may be nitrogen, helium or argon. The oxygen content may be between 1% and 99%.

The influence of gas pressure is of little significance, and treatment may in particular be performed at ambient pressure in the case of air, or with a slightly elevated pressure in the case of oxygen or synthetic mixtures of gas, said elevated pressure being for example between 0.1 kPa and 5 kPa.

The duration of treatment will depend mainly on the composition of the gas (in particular on the oxygen content), the temperature and the grain size.

Since treatment is performed in the presence of oxygen, for example in air, at ambient pressure, the temperature is between approximately 150 and 800° C., for treatment times of between 5 minutes and 15 hours. It must be ensured, when treating very fine TiN powders, that temperature is raised progressively in order to prevent abrupt oxidation of the powder by ignition.

The titanium nitride powder modified according to the present invention, obtained after such an oxidising pretreatment, may be handled without any particular precautions other than those recommended for titanium nitride powders produced according to the various production processes already mentioned above.

According to the present invention, the zinc anodes will preferably be produced according to the production processes described in French patent applications 99 00859 and 01 10488.

It will be noted in particular that at this stage, according to document FR 99 00859, the anode has two, or even three, electrical collection networks, which constitute as many sets of potential zinc nucleation sites during recharge, although the conductive ceramic powder is the first among these networks:

the electrode support and charge collector, preferably of the reticulate metal foam type,
the dispersion of conductive ceramic particles in the anodic mass,
a possible dispersion of bismuth within said anodic mass.

Apart from the pretreated TiN particles which here constitute the conductive ceramic and will be the main conductive zincate binding sites, it may also be useful, as described in document FR 01 10488, to introduce into the anodic mass additives such as alkali metal or alkaline-earth metal titanates, and also to add to the mixture of conductive ceramic and titanates, or to the active mass, a quantity of an additive consisting of at least one compound based on aluminium and/or calcium, and/or a quantity of an additive consisting of at least one compound which, on contact with the alkaline electrolyte, forms soluble aluminium compounds, of between approximately 1 and 5% by weight relative to the zinc oxide.

The electrolyte may also have added to it a quantity of an additive consisting of at least one soluble compound of aluminium and/or of calcium, of between approximately 1 and 5% by weight relative to the zinc oxide.

The authors have observed that the ion-exchange power of the to ceramics pretreated according to the invention is improved by the addition of aluminium and/or calcium in various forms to the anodic active mass or to the electrolyte.

The zinc anode used may advantageously be of the pasted/plasticised electrode type, and thus be produced by pasting, coating or filling by any means, in the liquid or dry phase, of a highly porous, three-dimensional support of the reticulate honeycomb metal foam type, with a paste in particular containing zinc oxide powder, the dispersion of ceramic particles, a plasticiser, and optionally a suspending agent.

By way of non-limiting illustration of the present invention, an advantageous example of embodiment is described below which makes it possible to assess the worth of the present invention.

Nickel-zinc storage batteries are produced with pasted/plasticised nickel cathodes within a support of nickel foam. The zinc anodes are produced by pasting a copper foam support, covered with lead by electrolytic deposition, of grade 45 PPI (pores per inch) or 18 pores per linear centimeter. The surface density of the support is 450 g/m².

The active mass for the zinc electrodes is prepared to form a paste of the following composition:

| | |
|---|---|
| zinc oxide, | |
| titanium nitride[1]: | 15%[2], |
| calcium titanate: | 2.5%[2], |
| bismuth oxide: | 5%[3], |
| nickel hydroxide: | 5%[3], |
| plasticiser: | PTFE[4], |
| suspending agent: | water. |

[1] average particle size: approx. 1 micron
[2] by weight relative to the active mass
[3] by weight relative to the zinc oxide
[4] introduced in the form of a 60% aqueous suspension, the concentration of PTFE being 4% by weight relative to the zinc oxide.

The TiN powder used for the type A electrode is a commercial product. The TiN powder used for the type B electrodes is identical to the powder used for the electrodes A, but has undergone an oxidation pretreatment of 30 minutes at 250° C. in air according to the present invention.

For all the anodes produced, the solid particles constituting the active mass were subjected to thorough kneading before the addition of water, in order to ensure that they were mixed intimately and as homogeneously as possible.

The electrolyte used is potassium hydroxide (KOH) of a concentration of 5 N. It is saturated with zincates and contains 10 g/l of lithium hydroxide (LiOH).

Once introduced within the metallic support, the initial thickness of which is 2 mm, the active mass is dried, and the resultant zinc anode is compacted under a compaction pressure of 80 kg per square centimeter. Thickness is reduced 0.8 mm.

The electrolyte used is potassium hydroxide (KOH) of a concentration of 5 N. It is saturated with zincates and contains 10 g/l of lithium hydroxide (LiOH).

Open nickel-zinc storage battery assemblies were produced by associating two nickel cathodes with one zinc anode, such that the latter defines the capacity of the storage battery and the properties thereof may be monitored during testing.

A combination of two separators is used between the electrodes of opposite polarity. One is a microporous membrane, such as that offered for sale under the brand "Celgard" by the company Hoescht Celanese. The other is a nonwoven polyamide or polypropylene separator, such as the reference product "FS 2115" from Carl Freudenberg.

The storage batteries produced in this manner are subjected to long-term cycling tests in accordance with standardised methods. The type of charge-discharge cycle used, at a set current, is as follows: C/4 mode (charge and discharge each performed in 4 hours, the applied current corresponding to one quarter of the nominal capacity of the element) with a depth of discharge of approx. 80%; one cycle comprising total discharge (100% depth) is performed every ten cycles.

The type A electrodes retain more than 80% of their nominal capacity for 300 to 400 cycles depending on the particular electrode before their capacity drops off very rapidly.

The type B electrodes retained more than 80% of their nominal capacity for more than 1,000 cycles, and achieved more than 1,500 cycles with a capacity greater than 70% of nominal capacity. Cycling was stopped after 2000 cycles without any abrupt drop in capacity being observed.

It has thus been shown, for the purposes of the present invention, that the high levels of performance achieved by adding conductive ceramics to the anodic mass are very greatly enhanced by subjecting the TiN particles to an oxidising pretreatment, said pretreatment being performed at elevated temperature in the presence of oxygen and leading to the formation of titanium oxides and oxynitrides on the surface of the ceramic particles.

On contact with the alkaline electrolyte of the zinc anode generators, said titanium oxides and oxynitrides may in turn change into partially crystallised titanates so forming zincate binding zones and imparting to the ceramic particles their second function of retaining zincates as the site of formation thereof (by oxidation of metallic zinc on discharge).

This function is in addition to the primary electron conduction function of the ceramic particles, which latter function promotes the in situ reduction of said zincates into metallic zinc when the generator is charged.

This twin function of the pretreated ceramic additive according to the invention thus makes it possible to avoid over the very long term the morphological changes to the zinc anode which are usually observed and would result in a short cycle life.

Without departing from the scope of the present invention, the invention may be performed by being associated with some or all of the additives or charging procedures described in the literature and applied to the use of zinc electrodes.

Naturally, and as will be clearly evident from the above, the invention is not limited to the specific embodiments which have been described by way of example. The invention is not limited to the stated examples thereof, but encompasses all variants.

The invention claimed is:

1. A process for preparing a zinc anode for an alkaline secondary electrochemical generator comprising in its active mass an additive constituted of a conductive ceramic powder of titanium nitride particles, wherein the conductive ceramic powder of titanium nitride particles has undergone an oxidizing pre-treatment at 250° C. for 30 minutes before being incorporated into the active mass of said anode.

2. The process according to claim 1, wherein the titanium nitride particles have a particle size essentially less than 10 microns.

3. The process according to claim 1, wherein the oxidizing pre-treatment is performed in the presence of oxygen.

4. The process according to claim 1, wherein the oxidizing pre-treatment is performed in air.

5. The process according to claim 1, wherein the titanium nitride is obtained by nitriding titanium.

6. The process according to claim 1, wherein the titanium nitride is obtained by nitriding titanium dioxide.

7. The process according to claim 1, wherein the titanium nitride is obtained by a self-propagating thermal reaction from titanium oxide or titanium halides.

8. A process for preparing a zinc anode for an alkaline secondary electrochemical generator comprising in its active mass an additive constituted of a conductive ceramic powder of titanium nitride particles having a particle size essentially less than 10 microns, wherein the conductive ceramic powder of titanium nitride particles has undergone an oxidizing pre-treatment at 250° C. for about 30 minutes before being incorporated into the active mass of said anode.

9. The process according to claim 8, wherein the oxidizing pre-treatment is performed in air.

* * * * *